(12) United States Patent
Graeb et al.

(10) Patent No.: US 10,572,231 B1
(45) Date of Patent: Feb. 25, 2020

(54) COMPONENT GROUPING FOR APPLICATION DEVELOPMENT

(71) Applicant: Amazon Technologies, Inc., Reno, NV (US)

(72) Inventors: Michael Graeb, Seattle, WA (US); Terence John Michaels, Fallbrook, CA (US); Bradley Rebh, Kenmore, WA (US); Eric Schenk, Seattle, WA (US); Glenn Warren Van Houten, San Diego, CA (US); Daniel Lawrence Youhon, Mission Viejo, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 15/863,336

(22) Filed: Jan. 5, 2018

(51) Int. Cl.
*G06F 8/36* (2018.01)
*G06F 8/34* (2018.01)

(52) U.S. Cl.
CPC . *G06F 8/36* (2013.01); *G06F 8/34* (2013.01)

(58) Field of Classification Search
None
See application file for complete search history.

(56) References Cited

U.S. PATENT DOCUMENTS

| | | | | |
|---|---|---|---|---|
| 8,303,416 B1* | 11/2012 | Thakkar | ............... | A63F 13/12 463/42 |
| 2002/0142825 A1* | 10/2002 | Lark | ............... | G06Q 20/382 463/16 |
| 2003/0027632 A1* | 2/2003 | Sines | ............... | A63F 3/00157 463/29 |
| 2003/0055892 A1* | 3/2003 | Huitema | ............... | H04L 29/06 709/204 |
| 2004/0148333 A1* | 7/2004 | Manion | ............... | H04L 63/104 709/201 |
| 2004/0166918 A1* | 8/2004 | Walker | ............... | G07F 17/32 463/16 |
| 2006/0075885 A1* | 4/2006 | Bailey | ............... | H04S 3/00 84/630 |
| 2006/0248450 A1* | 11/2006 | Wittenberg | ............... | G06F 8/00 715/209 |
| 2006/0287098 A1* | 12/2006 | Morrow | ............... | G07F 17/32 463/42 |
| 2007/0066403 A1* | 3/2007 | Conkwright | ............... | A63F 13/10 463/43 |

(Continued)

*Primary Examiner* — Daxin Wu
(74) *Attorney, Agent, or Firm* — Hogan Lovells US, LLP

(57) ABSTRACT

Components associated with application entities can be grouped into one or more component groupings. A grouping can include, for example, components that include or specify parameters and settings for a gameplay entity of a gaming application. The grouping of components enables a single component group to be displayed through an editor interface instead of all the individual grouped components, which simplifies the view through the interface. A user can select important parameters to be exposed at the group level, such that those parameters can be accessed and set without having to access and search through the individual grouped components. The grouping can also be saved and used to develop subsequent entities, which can simplify the development process and ensure that necessary components are included for specific entity types.

20 Claims, 9 Drawing Sheets

(56) References Cited

U.S. PATENT DOCUMENTS

| | | | |
|---|---|---|---|
| 2009/0170608 A1* | 7/2009 | Herrmann | G06Q 30/02 463/42 |
| 2010/0013860 A1* | 1/2010 | Mandella | G01B 21/04 345/650 |
| 2011/0287828 A1* | 11/2011 | Anderson | G07F 17/32 463/25 |
| 2014/0075347 A1* | 3/2014 | Banerjee | G06F 8/38 715/763 |
| 2017/0259177 A1* | 9/2017 | Aghdaie | A63F 13/67 |
| 2018/0001216 A1* | 1/2018 | Bruzzo | A63F 13/20 |
| 2018/0243656 A1* | 8/2018 | Aghdaie | A63F 13/79 |

* cited by examiner

COMPONENT GROUPING FOR APPLICATION DEVELOPMENT

BACKGROUND

An ever-increasing amount of content is being provided electronically. As a result, there is a significant need for tools useful in developing applications or other digital offerings that support providing of this content. Approaches such as object-oriented programming are used to simplify the development of these applications. For complex objects, there may be various parameters or components that are applicable, and which impact the functionality of these objects. In a standard application development or editing console, it can be difficult to view, track, and/or manage the various parameters and components, which can add to the difficulty in developing and managing these applications and services.

BRIEF DESCRIPTION OF THE DRAWINGS

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Approaches in accordance with various embodiments provide for the creation and management of electronic content. In particular, various approaches provide for the grouping of components associated with entities of an application. This can include, for example, components that include or specify parameters and settings for a gameplay entity of a gaming application. The components can include references to other components, or components of other entities, among other such options. The ability to group a number of components enables a single component group to be displayed through an editor interface instead of all the individual grouped components, which simplifies the view through the interface. A user can select important parameters to be exposed at the group level, such that those parameters can be accessed and set without having to access and search through the individual grouped components. The grouping can also be saved and used to develop subsequent entities, which can simplify the development process and ensure that necessary components are included for specific entity types.

Various other functions can be implemented within the various embodiments as well as discussed and suggested elsewhere herein.

Figure 1A:
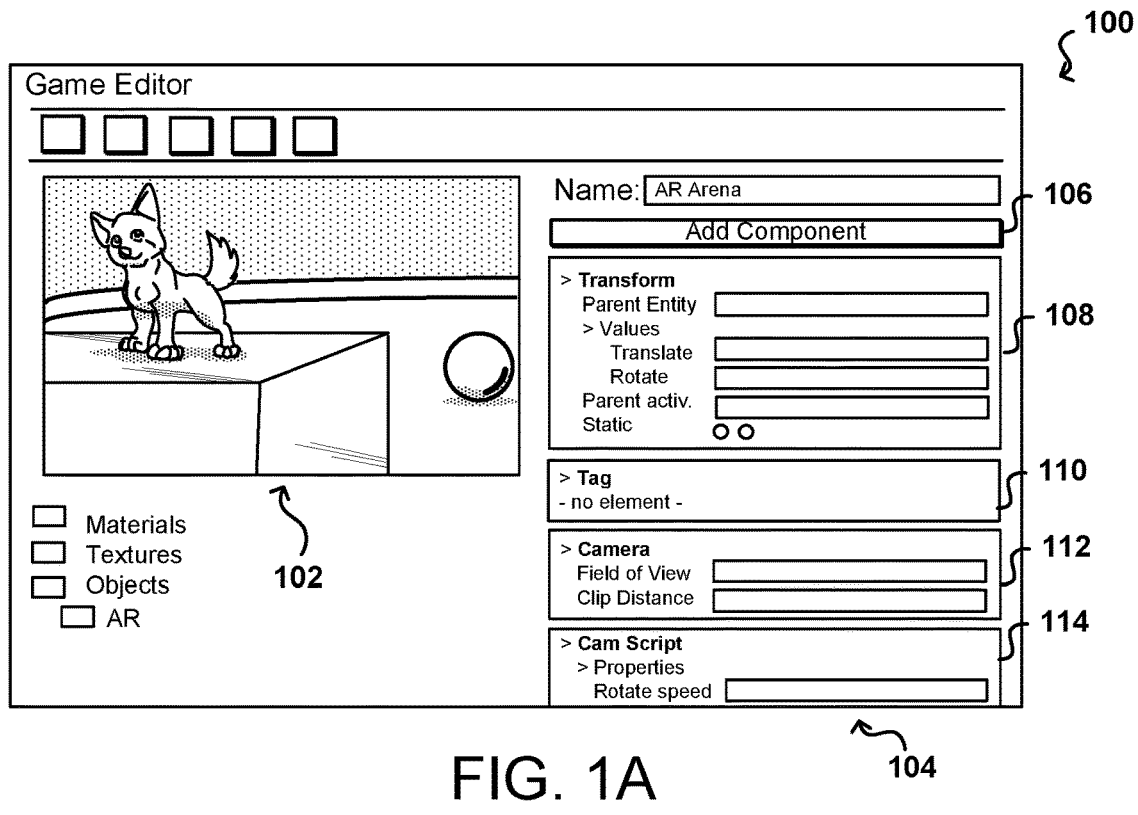
FIGS. 1A and 1B illustrate example interface states that can provide for the grouping of components for one or more entities that can be utilized in accordance with various embodiments.

When developing electronic content such as an application or video game, a developer will often use various tools, interfaces, and/or platforms for generating or modifying various aspects of the content. One such interface 100 is illustrated in the example of FIG. 1A. In this example, a developer has accessed a graphical user interface (GUI) that enables the developer to generate or modify game content using various tools and options provided through the interface. In this example, an image 102 is displayed that provides a view of the content being generated or modified. In this example, the view illustrates a gameplay object, here a playable animal (or character or avatar), that is able to virtual move and act within a specified game environment. The playable character, objects represented in the game environment, and aspects of the game environment itself can all be represented as entities within the game environment. A game "entity" can generally refer to any virtual object that can be represented in a game, either as a visible element (when rendered and displayed) or as an action or occurrence, among other such options. Some entities can take one or more actions in the game, such as for playable characters or non-player characters, or may take no specific actions, such as scenery or background objects. In some cases, an entity can refer to an action itself. There can be various parameters for an entity whose values impact these and other actions. The parameters can be specified on the entity, or through the use of one or more "components," as referred to herein. A component can define actions or aspects of an entity, and can be associated with a list of services that can be provided through the component. A component can also define relationships between various components for the same entity, or other entities. The services for a component can be defined according to a service specification, which can enable communications between the services, interactability between services, and ordering of activation of components on an entity, among other such options.

An interface such as that illustrated in FIG. 1A thus can enable a user to specify an entity to be modified, and then add, remove, or modify components with respect to that entity. In this example, a set of components 104 has been applied to a selected gameplay entity. A user can add components using a relevant interface option 106, which can enable the user to perform tasks such as to select an existing component to apply, create a new component, or search for a component, among other such options. Each of these components 108, 110, 112, 114 can have one or more parameters or values that can be specified to control the operation or appearance of the respective component and/or entity. For entities with large numbers of components that have large numbers of parameters or options, this can create a long and very complex set that can be difficult to view within an interface such as a game editor. Further, when a user is working with entities that contain many components, it can be difficult for that user to determine which of the components need to be configured and which properties of those components should be modified.

Accordingly, approaches in accordance with various embodiments provide for the grouping of components for application and service development. Approaches can also provide for the combining of multiple components into a single component or component group. A user (or other person or organization) can group components that are related or that otherwise make sense to group, such as for components that relate to the appearance of objects that do not move in a game. The user can also have the ability to name the group to a useful name or identifier, and can save or otherwise designate component groups for inclusion or attachment to other entities and applications. In some embodiments, this can include saving the component group or group card as a component asset that can be used to build one or more libraries of multi-component relationships. In some embodiments, a user can also select properties of the various grouped components to expose at the group level. This can enable a user to quickly view the most relevant or important parameters at the group level, without having to view or access the individual underlying components.

Figure 1B:
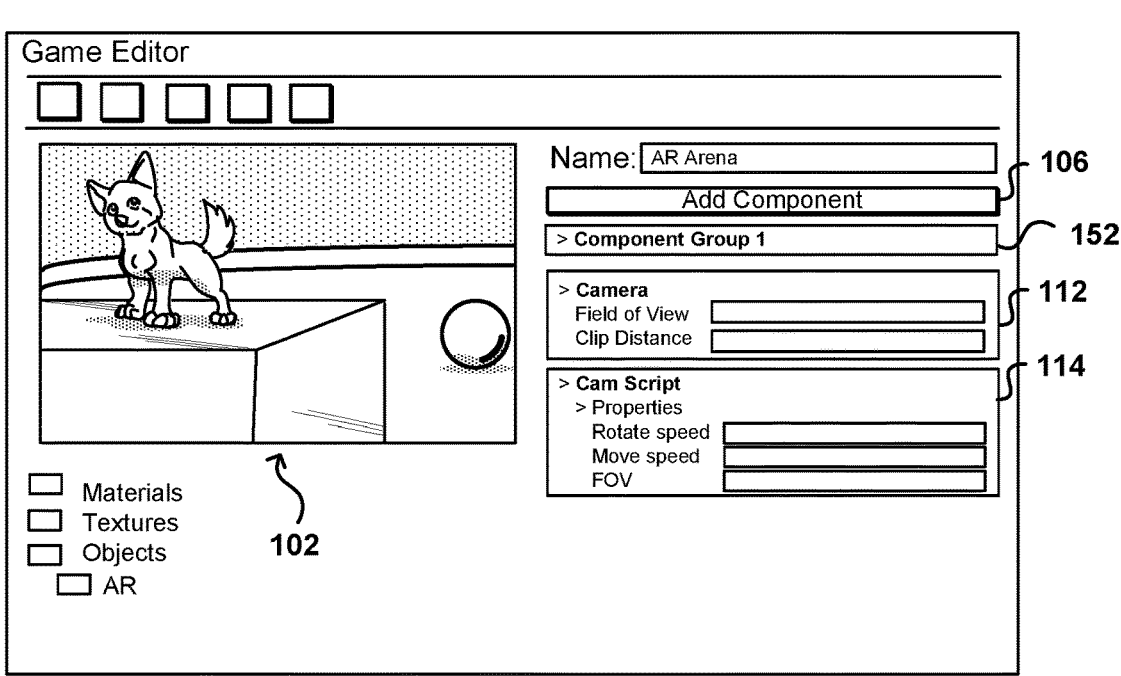

As an example, a user can select a subset of the components illustrated in FIG. 1A, and select to group those components into a determined component group. In this example, the user selects two components 108, 110 and causes those two components to be added to a component group 152, illustrated in the example interface state 150 of FIG. 1B. It should be understood that there may be higher or no limits to the number of components that can be grouped in some embodiments, and in many instances a group will include more than two components as presented here for illustration. As illustrated in FIG. 1B, the grouping of the components has enabled additional fields and options to be displayed concurrently in the interface. The user will still have the option to expand the group 152 or otherwise access the individual components, parameters, and other settings or values as appropriate. Such an approach can quickly assist a user in locating a relevant component, if the components are grouped logically by groupings such as "cameras," "background elements," "characters," and "gameplay actions," among other such options. In some embodiments there can also be subgroupings that enable a user to more quickly locate relevant objects, and enable related components to be displayed concurrently without significant additional complexity or confusion due to the display of several other, unrelated components.

Such a component entity system can provide a modular and intuitive approach for developing games and other applications. A component entity system in accordance with various embodiments can work at both the system level and the entity level. In addition to component management and grouping functionality, such a system can employ functionality such as reflection, serialization, event messaging, and cascading slices, among other such options. A component in some systems can take the form of a simple class that inherits from a master component class or other such source. The behavior of a component in some embodiments can be determined, at least in part, by its reflected data and the actions it takes when it is activated. An example component is given by:

```
Class MyComponent
  : public Zone::Component
{
public:
  Zone_Component(MyComponent, "{0C0 . . . 381}");
  //Zone::Component interface implementation
  void Init( ) override { }
  void Activate( ) override { }
  void Deactivate( ) override { }
  // Required Reflect function.
  static void Reflect(Zone::ReflectContext* context);
  // Optional functions for defining provided and dependent services.
  static void GetProvidedServices(Zone::ComponentDescriptor:DependencyArrayType& provided);
  static void GetDependentServices(Zone::ComponentDescriptor:DependencyArrayType& dependent);
  static void GetIncompatibleServices(Zone::ComponentDescriptor:DependencyArrayType& incompatible);
};
```

As mentioned, components can be used to add or specify various types of functionality for an entity, and an entity can have various numbers of components specified for various types of tasks. The tasks can include functionality relating to, for example, rendering a game session level or match, or controlling a camera for such a session. The functionality can also relate to gameplay physics, character intelligence, visual scripting, and other such aspects. Components can be thought of as building blocks that can be used to build a game or application, with at least some of the components building on the underlying components. As mentioned, a user can add components to provide specific functionality, and in at least some embodiments the system can provide recommendations or guidance as to other components that should also be selected to provide for certain types of functionality. In addition to selecting the appropriate components, the user can also specify the values that dictate the specific implementation of that functionality for the respective entity. The system can include some amount of verification logic to ensure that the values provided are not in conflict, or will not otherwise generate undesired behavior or effects in the game.

An example entity can then include potentially hundreds of components, which can each include hundreds of parameters or adjustable aspects. These components can be standardized as part of a library, or can include user-provided or modified components that may have very different structures or adjustable aspects. Various systems are highly extensible to support additional types of gameplay and functionality. Components can themselves be highly complex, and there can be components on the components themselves, as well as components that reference or access components of other entities. As mentioned, without the ability to group these components it can be very difficult to attempt to properly develop an application due to the sheer volume of information that is exposed. It can be desirable in at least some embodiments to group the components to a more manageable set of component groups that are logically assembled and can be more easily navigated by a user. Further, if the user is able to specify one or more of the component parameters to expose on a group, the user may not need to open the groups at all for specific actions. For example, a camera component group might include a set of three or four parameters such as camera type, position, and behavior, which can be set for an entity without locating the respective parameters on the underlying components. A user could set those parameters for the component group and move on to other development tasks. In conventional approaches, the user would need to locate the parameters in the various components, and if the user was not aware of the functions of the various components would need to analyze the options available for each component and understand their respective functionality. Approaches in accordance with various embodiments thus not only help with organization and display, but can simplify the development process by exposing, at the group level, the primary parameters needed to be set for a specific application or entity. In at least some embodiments an authorized user can specify which parameters or properties of the various components are important and can indicate that those parameters or properties are to be exposed at the group level. The groupings can also help with the development process by ensuring that certain components are included for an entity, such as by including a necessary collider component in a physics-related component group.

In one example, a developer might want to add "static" elements to a gameplay scene, such as trees or rocks that do not move or perform actions within the environment. These static elements may have models or meshes to be rendered, and may have collision information indicated in case a player character or other gameplay element intersects or comes into virtual contact with the elements. Using a conventional approach, a developer would need to create a new entity, add a mesh component, add a physics component, and add a collider component, among other such options. An approach in accordance with various embodiments can instead enable a developer to select a static element group that includes these (and potentially other relevant) components, such that the developer can more quickly and completely generate the static entity. As mentioned, the group might also expose the relevant parameters or settings such that the developer can quickly configure the entity for inclusion in the game. The component group in this example can function as an entity template that a developer can select to more quickly and easily develop an entity of a particular type or class. A developer can open a folder or set of component groups and then select or otherwise drag the group onto the respective entity or into the editor interface. The developer can then edit the exposed properties on the group, or expand the group to access the individual components or properties of those groups.

Figure 2A:
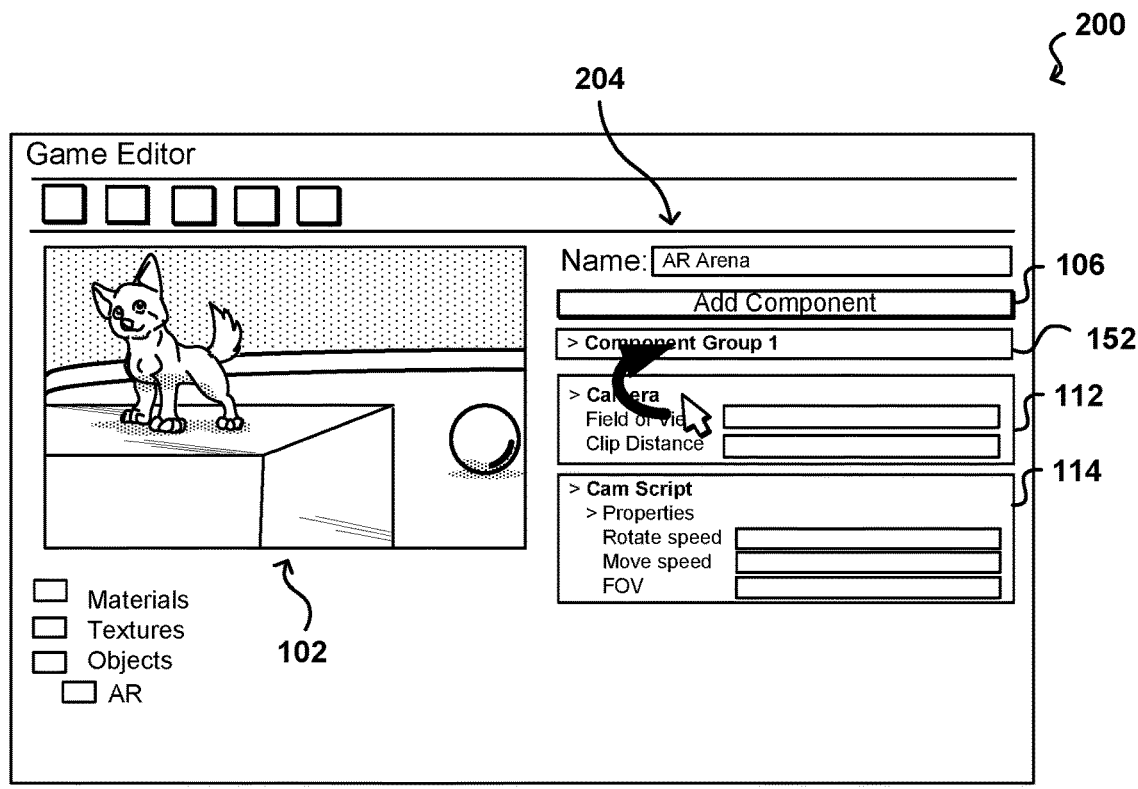
FIGS. 2A and 2B illustrate example interface states that can provide for the creating or modifying of component groupings that can be utilized in accordance with various embodiments.

In some embodiments there are no restrictions placed on the components that can be grouped together. Such an approach enables developers to arbitrarily group components as makes sense or is beneficial to the individual developer. Thus, each developer may have the option or ability to add, modify, or create groups of components as desired. The developer can also have the ability to specify or modify the parameters that are exposed for the group, as well as the names of those parameters as set for the group. This can be beneficial as there may be different parameters with the same name used by different components for a group, and the developer can utilize a name for the exposed group parameter that clearly indicates its function or use. FIG. 2A illustrates an example interface state 200 wherein the user is adding a component 112 to an existing component group 152. It should be noted that reference numbers may be carried over between figures for similar elements for simplicity of explanation, but that such usage should not be interpreted as a limitation on the scope of the various embodiments unless otherwise specifically stated. In this example, the user can use a mechanism such as a mouse cursor or touch-screen to perform a drag and drop, or other such action, whereby the camera component 112 will be added to an existing component group 152. This grouping can be stored as a general grouping, or can apply only to the specific entity identified 204, among other such options. This can help to further simplify the interface, and enable the appropriate components to be grouped. In some embodiments, a similar but reverse action can be performed to cause the component to be removed from the grouping.

Figure 2B:
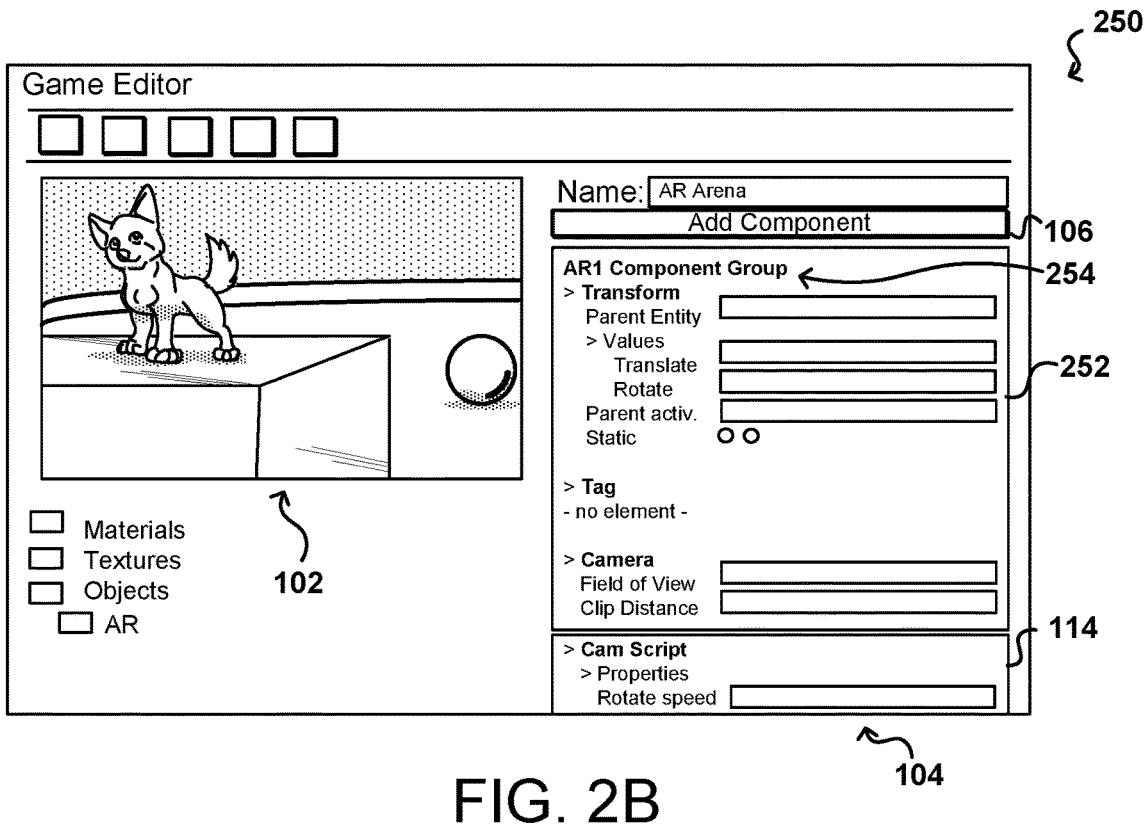

As mentioned, grouping of the components can greatly simplify the view of components applied to a specific entity in various embodiments. In at least some embodiments as discussed elsewhere herein, there can be groupings of other component groups into master and sub-groups, among other such options. Some groups can include both components and component groups as elements as well. As mentioned, groups can also be expanded as necessary to obtain a more detailed view or access specific parameters or information. For example, the interface state 250 of FIG. 2B illustrates the component group 152 of FIG. 2A after having been expanded by the user. As illustrated, the expanded view 252 of the component grouping enables the user to access the individual components of the group, as well as the properties or parameters for each. As mentioned elsewhere herein, there may be other sub-groupings that can be expanded or collapsed, and the properties of the individual components can also be collapsed or expanded in various embodiments. In some embodiments, the exposed parameters for the group can be displayed without first expanding the group, or displayed upon a first level expansion which illustrates the included components and exposed parameters, among other such options. As illustrated, the interface in this example has also enabled the user to adjust or set the name 254 of the group to a more appropriate or useful name. Various other names, parameters, sub-groupings, or other such aspects can be modified as well within the scope of the various embodiments.

Figure 3A:
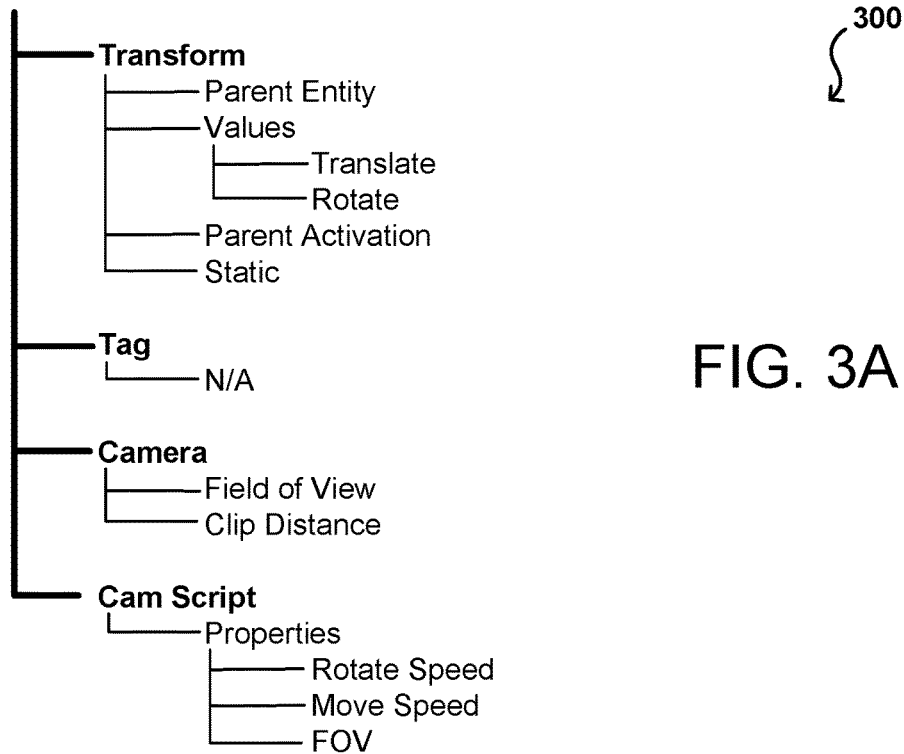
FIGS. 3A and 3B illustrate parameter hierarchies for component groupings that can be utilized in accordance with various embodiments.
Figure 3B:
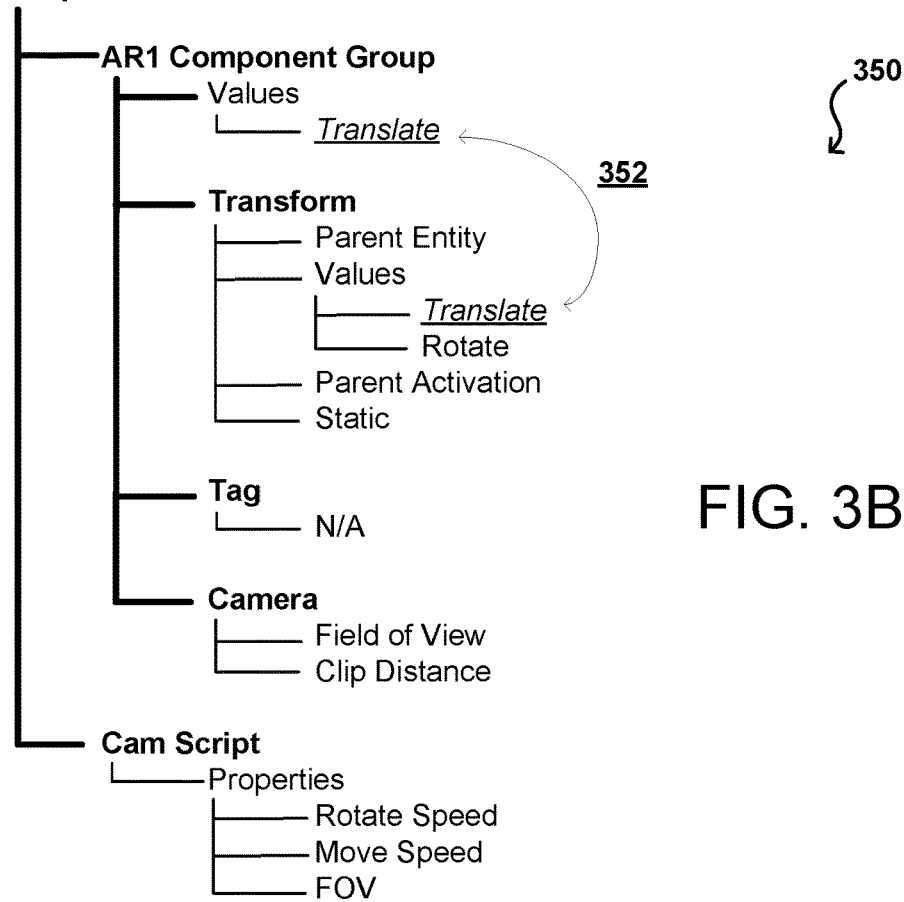

FIGS. 3A and 3B illustrate example component relationships that can be utilized in accordance with various embodiments. For simplicity of explanation, these trees generally relate to the parameters in the examples discussed previously. In the tree 300 of FIG. 3A, it can be seen that there are four components applied or selected for a specific entity. These components are all attached at the same level, and thus would be visible in the game editor or other relevant interface. Using a conventional interface, such an arrangement would cause all these values to be displayable through the interface, wherein a user would need to scroll or otherwise navigate between the various parameters because there are more parameters available than can be displayed concurrently on a single display.

In the example tree 350 of FIG. 3B, three of the components have been added to a component group called "AR1 Component Group." Thus, the initial (unexpanded) view of the components in the interface would display the Component Group name, and any other information determined to be exposed when collapsed, as well as the single remaining Cam Script component. In this way, the vast majority of the parameters associated with the grouped components will not be displayed unless the user decides to expand the component group through the interface. As mentioned, the user can also have the ability to expose or encapsulate the most useful or important parameters at the group level. This can be accomplished through a selection action, drag and drop, or other such operation. In this example, the user has taken a "translate" property from the Transform component and exposed that parameter 352 as a parameter of the overall grouping. Although not illustrated, in some embodiments there can be some visual indicator (symbol, font aspects, etc.) indicating that a specific parameter of a component has been shared at the group level, etc. Using such an approach, the user can quickly locate and set that parameter value without having to navigate through the various components of the grouping to locate and/or identify the relevant setting. It should be understood that there are only a few components illustrated here for simplicity of explanation, but that in practice there may be dozens of components grouped into three or more groupings, with additional components not included in any of the groupings. Further, the user can expand or collapse each of these groupings individually as appropriate.

When determining which components to group, one approach will be to identify components that generally are used together or applied to the same types of entities. Examples discussed herein include the grouping of physics components, camera components, motion components, and the like. There may be components that work for player characters, types of characters, specific actions or events, level, etc. Groupings can be made at the application level, enterprise level, and/or developer level, among other such options. The ability to modify a grouping may depend at least in part upon the type or source of the grouping, as a user may have unlimited ability to modify user groupings but no ability to modify application-level groupings. Information about the type of grouping may be included with the grouping, such as through a dedicated entry or type icon associated with the group. A user can also have the ability to apply specific component icons or parameter icons to the group to help identify the purpose for the group or types of parameters included. The use of a header bar with component icons can help to more quickly identify and access the relevant options. In at least some embodiments an editor or interface can also allow for searching of specific components or properties, using names or other relevant aspects, such as property values.

Although there may be no limitations or restrictions on the groupings by default, there may be options to set ranges or limitations on the various components, parameters, and/or groupings. For example, there might be a maximum number of components for a grouping, or maximum number of exposed parameters. There may be allowable values ranges set for specific parameters, or types of values allowed. There may be some amount of logic or script applied to verify that there are no conflicts resulting from a selection or combination, and in some embodiments there may be recommendations for components or values made based on current selections. For example, the inclusion of one component for a type of entity might require the addition of another component, or two components might be in conflict and the user might need to select at most one of the conflicting components, among other such options. A user can also potentially create or apply rules or policies for specific components or groupings.

When associating a component or component grouping with an entity, there may be at least some acceptance criteria that must be satisfied. Once satisfied, the information can be saved or persisted in a way that is associated with the entity and can be retrieved or loaded as needed. The components can thus be persisted and serialized out for reloading as the relevant level (or other gameplay segment) is loaded. An order of loading can also be specified, as well as relations to other components or entities, etc. In some embodiments component groupings can be copied and pasted amongst various entities, or otherwise applied or moved to other entities in the same editor, which may enable the groupings to be applied without, or independent of, persistent storage of those groupings.

Figure 4:
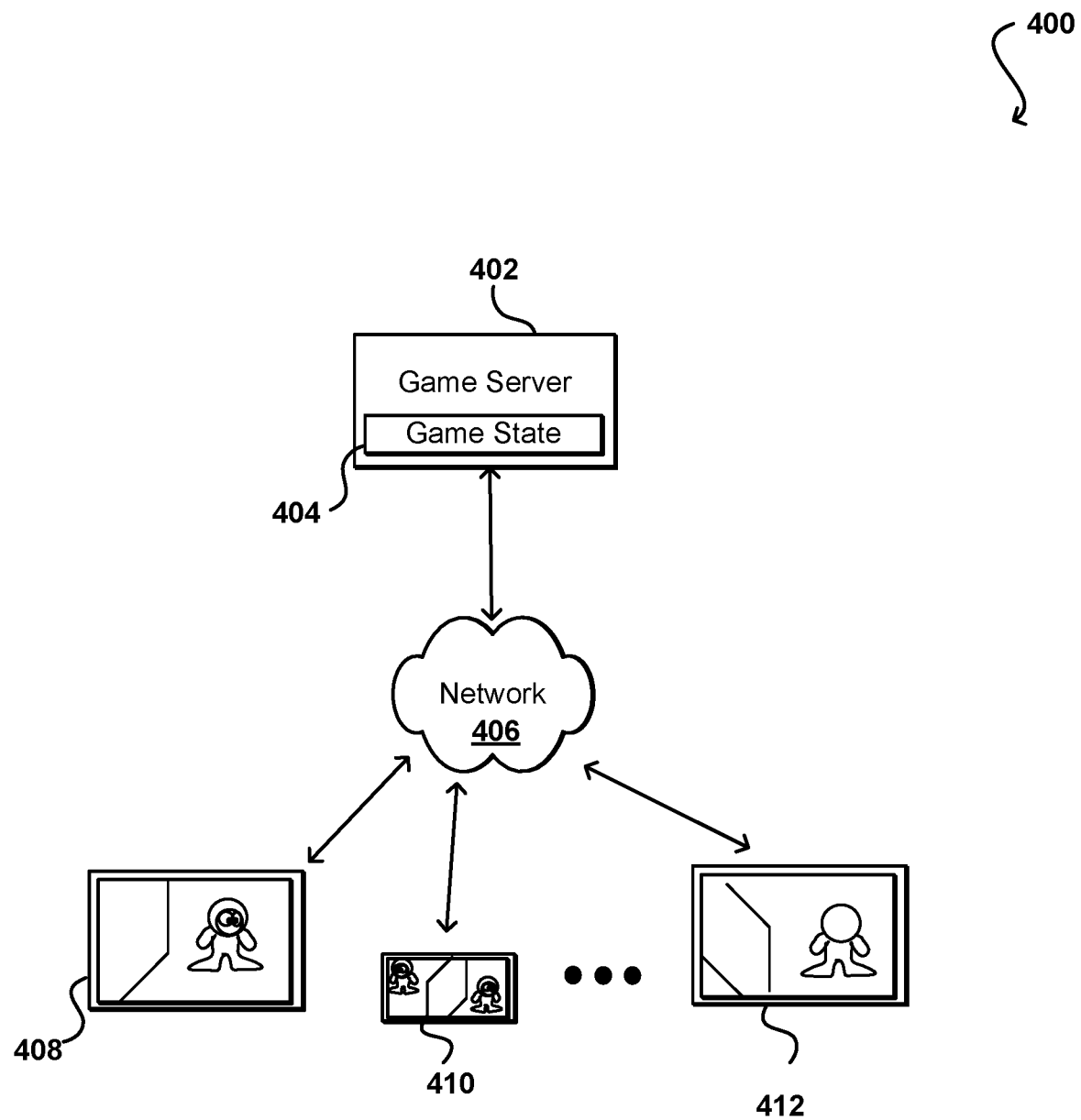
FIG. 4 illustrates player devices for a multiplayer online gaming session that can be developed in accordance with various embodiments.

As mentioned, in some embodiments this data can pass be sent from the various devices 408, 410, 412 for an AR session to a central server 402, or other such system or service, as illustrated in the example system 400 of FIG. 4. While a game server is discussed in this example, it should be understood that any server dedicated or allocated to an AR-inclusive session can be utilized as well within the scope of the various embodiments. In this example, a gaming application is hosted on at least one game server 402. The game server 402 can be a local gaming machine or a remote server operated by a game provider, among other such options. In this example the game offers multiplayer capability, whereby multiple players can utilize respective devices 408, 410, 412 to connect to the game server 402 over at least one network 406, such as the Internet, a local area network, a dedicated gaming network, a peer-to-peer network, or a cellular network, among other such options and combinations thereof. The players can join in a session of the game with state data that is managed by a game state component 404 of the game server. In some embodiments one or more game servers 402 can execute the game, while in others the servers can manage game state for instances of the game executing on the various player devices 408, 410, 412. These devices can include specific gaming devices, such as gaming consoles or handheld consoles, or other computing devices such as smart phones, tablet computers, wearable computers (e.g., smart glasses or watches), desktop or notebook computers, and the like. State information can be transmitted to the gaming server 402 at appropriate times, such as periodically, in response to certain actions or occurrences in the game, in response to requests from the server, or at other appropriate times. The game server can maintain the state information such that the game state is consistent across the various devices, as well as to enable a saving or restoring of the game for any or all of the devices. This can include, for example, maintaining an authoritative point cloud, set of position information, or set of geometric constructs for a gameplay region, such as a room, area, or arena as discussed herein. The server 402 can build up this information using data received from the various devices, and update the information based on updates to the received data. The server can maintain this point or construct data as part of the stored game state 404, and can send the information across the appropriate network(s) 406 to the various devices as appropriate, such as may be based upon the location and orientation of the device, and the corresponding field of view for which AR content can be rendered. In other embodiments, however, the position or construct data can be sent between devices independent of the game server 402, either through the network 406 or directly using a local communication protocol (e.g., Bluetooth or NFC). In situations where the data is sent between devices, the devices can either agree upon an authoritative data set or make local determinations for local rendering on the respective devices, among other such options.

In the example configuration of FIG. 4, the various devices can capture and analyze image or sensor data to generate point cloud and/or hit point test results, which can then be sent over the network(s) 406 to the dedicated server 402. The server can aggregate the data, based at least in part upon timestamps for the data as well as the relative locations and orientations of the respective devices. In at least some embodiments the positions can be geo-locations, while in other embodiments the locations can be with respect to a determined anchor or reference point in the gameplay area, among other such options. The server can utilize this aggregated data to generate an accurate impression of the gameplay (or other relevant) area, which can be maintained in a point cloud, model, set of geometric constructs, or other such representation. The server 402 can then relay some or all of this information to the various connected devices 408, 410, 412 that are involved in a session for an augmented reality application, game, or other presentation. The data can be sent for the entire area, and updated as appropriate, or can be sent as needed based upon the field of view of the device and the respective portion of the area to be used for AR rendering. As mentioned, such an approach can be used in games by using the aggregated data to render a scene in an environment that would be too large for one device to handle, and updating the rendered content based on both movement of the devices and a change in state of the game. A similar approach can be used for non-gaming applications, such as for informational or shopping presentations, where the AR content can be rendered and updated using a similar approach.

While discussed with respect to gaming, various other AR applications can take advantage of improved accuracy in position and other such determinations as well. For example, in a sporting event such an approach can be used to render information on a track or playing surface. In a store, such information can be used to render pricing or product information, views of persons or characters wearing or using various products, etc. For tourism, such an approach can be used to render information or characters in various locations, in order to provide information about the location or site. Various other approaches can be used as well, in situations where it is desired to render at least some amount of AR content, but the size of the space is too large for any single device to accurately map or determine the position and other distant information.

Such an approach can provide the benefit that rendering can be performed relatively well on conventional computing devices, but the accurate capture and determination of position information for nearby objects can be difficult and resource intensive, and can only be relatively successful for many devices. While transmitting and receiving position data can introduce some amount of latency, and consume some amount of bandwidth or data transmission, the impact can be minimal due to the type of data transmitted and the fact that for most device motions the change in view will not exceed the latency, such that small variations can be handled using the data already stored by the device. A server, with its significantly greater capacity, can quickly generate a more accurate point cloud for the respective area and send that point data to the devices. In some embodiments this can involve sending only the delta information, as much of the information will not change between display frames or will only change upon a change in game state. Further, once the majority of the point cloud data for a region has been transmitted to a device, such as for the interior of a stadium, there may be very few changes to the cloud made, and the orientation of the device can be used to determine the appropriate rendering location, angle, etc. Thus, while in some embodiments the server may generate an authoritative rendering for the AR content and send the relative portions down to the devices, in others the server may send the relevant position, geometric constraint, and/or anchor data for use by the individual devices in rendering the relevant portion locally.

As mentioned, the location for each device can be determined using an appropriate technology or mechanism, such as GPS, iBeacon, or signal triangulation, among other such options. Movement of the device or changes in orientation can be determined using any of a number of sensors or components of the devices themselves, such as may include an electronic compass, magnetometer, accelerometer, electronic gyroscope, altimeter, and the like. The object and position information can be determined from captured sensor data, where the sensors can include various camera sensors (IR, ambient, stereoscopic), structure light components, ultrasonic sensors, or LIDAR sensors, among others.

Figure 5:
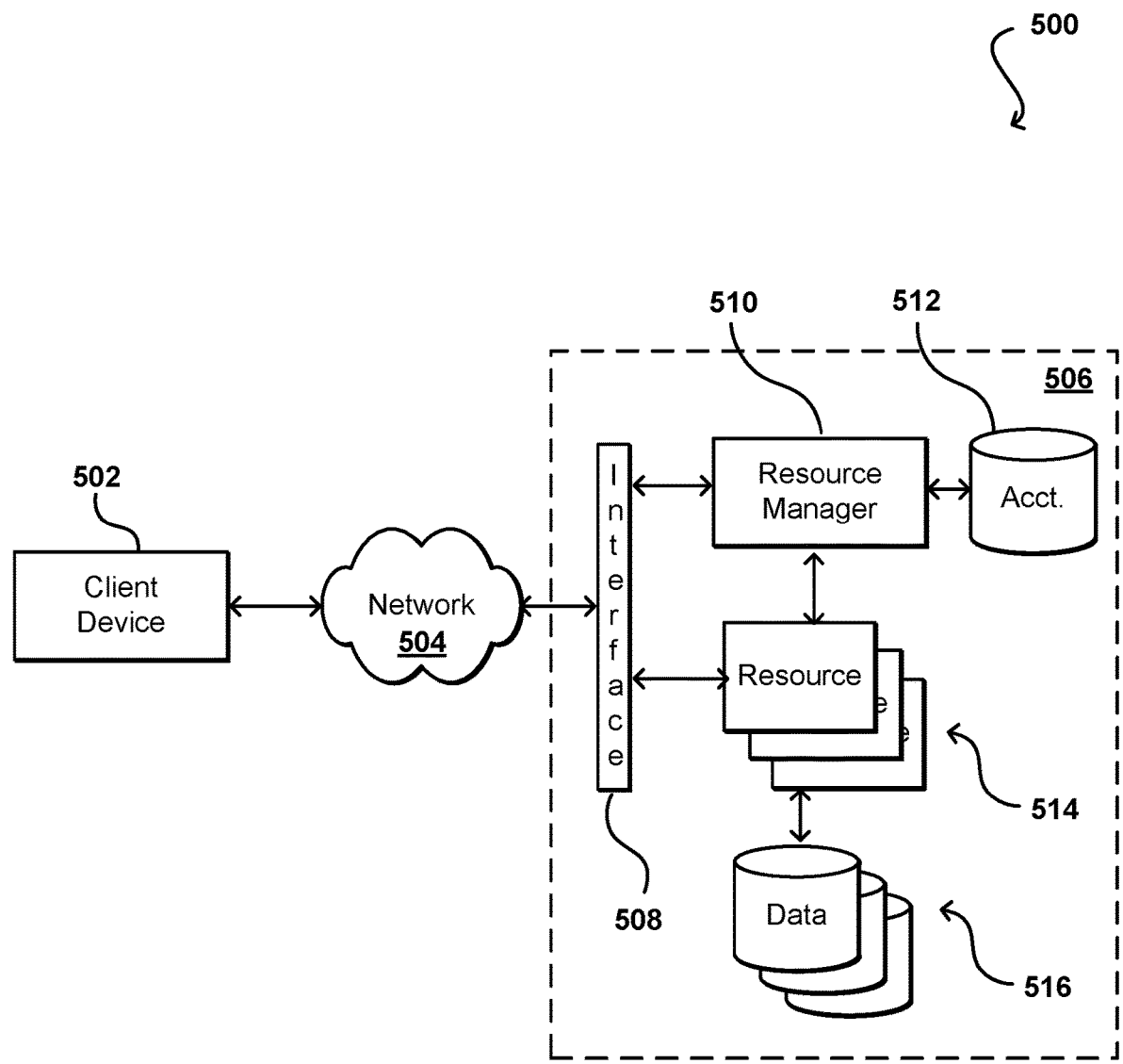
FIG. 5 illustrates an example environment in which various embodiments can be implemented.

FIG. 5 illustrates an example environment 500 in which aspects of the various embodiments can be implemented. In this example a user is able to utilize a client device 502 to submit requests across at least one network 504 to a multi-tenant resource provider environment 506. The client device can include any appropriate electronic device operable to send and receive requests, messages, or other such information over an appropriate network and convey information back to a user of the device. Examples of such client devices include personal computers, tablet computers, smart phones, notebook computers, and the like. The at least one network 504 can include any appropriate network, including an intranet, the Internet, a cellular network, a local area network (LAN), or any other such network or combination, and communication over the network can be enabled via wired and/or wireless connections. The resource provider environment 506 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users for a variety of different purposes. As used herein, computing and other electronic resources utilized in a network environment can be referred to as "network resources." These can include, for example, servers, databases, load balancers, routers, and the like, which can perform tasks such as to receive, transmit, and/or process data and/or executable instructions. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example the provider environment includes a plurality of resources 514 of one or more types. These types can include, for example, application servers operable to process instructions provided by a user or database servers operable to process data stored in one or more data stores 516 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, a user wanting to utilize a portion of the resources 514 can submit a request that is received to an interface layer 508 of the provider environment 506. The interface layer can include application programming interfaces (APIs) or other exposed interfaces enabling a user to submit requests to the provider environment. The interface layer 508 in this example can also include other components as well, such as at least one Web server, routing components, load balancers, and the like. When a request to provision a resource is received to the interface layer 508, information for the request can be directed to a resource manager 510 or other such system, service, or component configured to manage user accounts and information, resource provisioning and usage, and other such aspects. A resource manager 510 receiving the request can perform tasks such as to authenticate an identity of the user submitting the request, as well as to determine whether that user has an existing account with the resource provider, where the account data may be stored in at least one data store 512 in the provider environment. A user can provide any of various types of credentials in order to authenticate an identity of the user to the provider. These credentials can include, for example, a username and password pair, biometric data, a digital signature, or other such information. The provider can validate this information against information stored for the user. If the user has an account with the appropriate permissions, status, etc., the resource manager can determine whether there are adequate resources available to suit the user's request, and if so can provision the resources or otherwise grant access to the corresponding portion of those resources for use by the user for an amount specified by the request. This amount can include, for example, capacity to process a single request or perform a single task, a specified period of time, or a recurring/renewable period, among other such values. If the user does not have a valid account with the provider, the user account does not enable access to the type of resources specified in the request, or another such reason is preventing the user from obtaining access to such resources, a communication can be sent to the user to enable the user to create or modify an account, or change the resources specified in the request, among other such options.

Once the user is authenticated, the account verified, and the resources allocated, the user can utilize the allocated resource(s) for the specified capacity, amount of data transfer, period of time, or other such value. In at least some embodiments, a user might provide a session token or other such credentials with subsequent requests in order to enable those requests to be processed on that user session. The user can receive a resource identifier, specific address, or other such information that can enable the client device 502 to communicate with an allocated resource without having to communicate with the resource manager 510, at least until such time as a relevant aspect of the user account changes, the user is no longer granted access to the resource, or another such aspect changes.

The resource manager 510 (or another such system or service) in this example can also function as a virtual layer of hardware and software components that handles control functions in addition to management actions, as may include provisioning, scaling, replication, etc. The resource manager can utilize dedicated APIs in the interface layer 508, where each API can be provided to receive requests for at least one specific action to be performed with respect to the data environment, such as to provision, scale, clone, or hibernate an instance. Upon receiving a request to one of the APIs, a Web services portion of the interface layer can parse or otherwise analyze the request to determine the steps or actions needed to act on or process the call. For example, a Web service call might be received that includes a request to create a data repository.

An interface layer 508 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshalling or unmarshalling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 6:
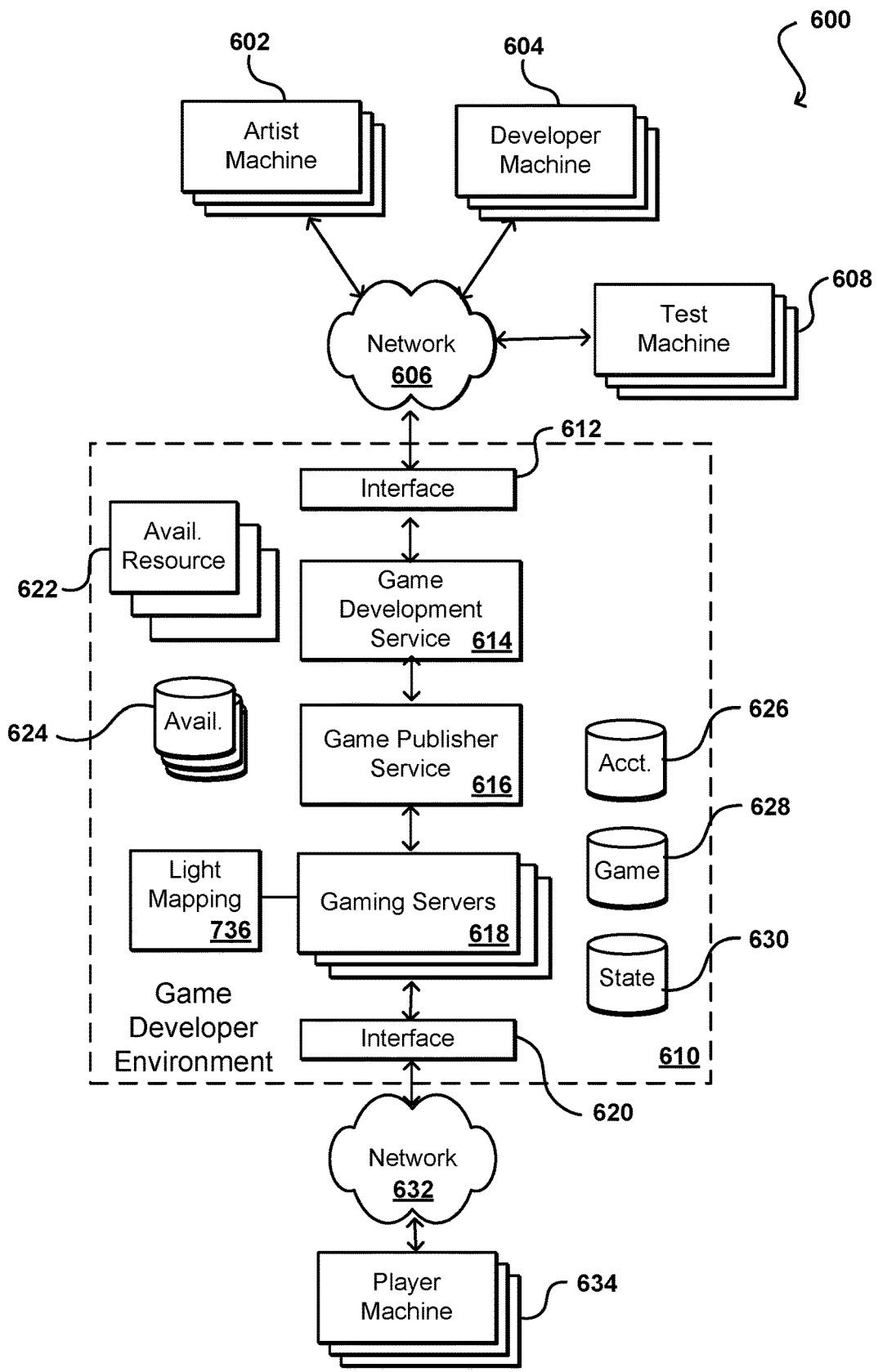
FIG. 6 illustrates an example gaming pipeline that can be used in accordance with various embodiments.

As illustrated in the example system 600 of FIG. 6, at least some of the resources can be used to support platforms and services useful in the development and providing of electronic gaming and three-dimensional graphical content, among other such options. For example, the artist machines 602 and developer machines 604 can collaborate via a game development service 614, which can be provided by a set of resources in a game developer environment 610, or other such resource environment, that are able to scale dynamically as discussed above. It should be understood that artists can fall within the group of people referred to herein as "developers," and that the distinction in this figure is to illustrate different types of users and purposes. Unless otherwise specifically stated, developers can include not only code developers, but also artists, game designers, engineers, quality assurance personnel, content creators, musicians, and the like. The game development service can perform tasks such as to enable the checking out or locking of items for a game, the management of game files amongst developers, the providing of tools or templates to use for gaming development, and the like. The development service can also provide communication services such as messaging and content sharing, among other such options. The game development service can store information for a game to at least one game repository 628, where the repositories can include graphics files, code, audio files, and the like. The game development service 614 can also work with an account manager, or at least maintain information in an account data store 626, such that the game development service can determine which resources, including amounts or types of resources, can be allocated on a customer's behalf for the development of one or more customer games or other such content. The account data can also specify which users are authorized to work on the gaming content, including types of content accessible, actions able to be taken, and the like.

Once the game development reaches an appropriate stage in the development cycle or pipeline, as may relate to alpha or beta testing, actual release or updating, etc., the appropriate content can be made accessible to a game publisher service 616. The game publisher service 616 can receive instructions regarding the type of release, format of the release, and other appropriate information, and can cause the game content to be published to an appropriate location for access. While illustrated as part of the service provider environment, it should be understood that components such as the gaming servers or game publisher could be executed on a local user machine as well, whether one of the developer machines 604 or otherwise. In some embodiments the game content might be published and made available to one or more test machines 608, which may be associated with the customer, such that the customer can test various builds or versions of the game. In some embodiments feedback provided by the test machines 608 may be provided to the game development service 614, which can maintain testing feedback or data and make that feedback available, via logs, messages, reports, or other such mechanisms, to the developers or other persons associated with the game development. If the game is to be made available to end users, gamers, or other such persons or entities, the game publisher service might publish the game content to an array of gaming servers 618 which can run the game and enable player machines 634 to access the game content over one or more networks 632, which may be different from the network(s) 606 used for game development. This can include, for example, dedicated gaming networks, the Internet, cellular networks, and the like. The player machines 634 can communicate with the appropriate interfaces of an interface layer 620 to obtain the gaming content. In some embodiments the player machines 632 will download the gaming content for execution on the individual machines, and will upload (or otherwise communicate) gaming data, messages, and other information to the gaming servers 618, as well as to other players, social networking sites, or other such recipients. The gaming servers 618 can cause state information for the various instances of the game to be stored to at least one game state repository. This can hold state for the game as a whole or for individual game sessions, among other such options. As mentioned, in some embodiments the devices can send position or image data to a dedicated gaming server 618 or other component in the game developer environment 610, which can be aggregated and analyzed by a surface mapping component, or other such system or process, which can determine authoritative data for use in rendering augmented reality content. The authoritative data can include, for example, point cloud data, geometric primitives, location modeling, and the like. At least some of this data can be provided to the various player devices 634 in order for those devices to render the appropriate AR content for the location and orientation of a given device. In some embodiments the game content can be executed by the game servers and streamed in near real time to the player machines 634. In some embodiments there may alternatively be a mix of gaming content executed on the player machines and the gaming servers. Peer to peer connections among the player machines and other communications can be utilized as well in various embodiments.

As mentioned, such an environment enables organizations to obtain and configure computing resources over a network such as the Internet to perform various types of computing operations (e.g., execute code, including threads, programs, software, routines, subroutines, processes, etc.). Thus, developers can quickly purchase or otherwise acquire a desired amount of computing resources without having to worry about acquiring physical machines. Such computing resources are typically purchased in the form of virtual computing resources, or virtual machine instances. These instances of virtual machines, which are hosted on physical computing devices with their own operating systems and other software components, can be utilized in the same manner as physical computers.

In many such environments, resource instances such as virtual machines are allocated to a customer (or other authorized user) for a period of time in order to process tasks on behalf of that customer. In many cases, however, a customer may not have a steady flow of work such that the customer must maintain a sufficient number of virtual machines to handle peak periods of work but will often have less than this amount of work. This can result in underutilization and unneeded expense for both the customer and the resource provider. Approaches in accordance with various embodiments can instead allocate resource instances on a task or event basis to execute a function. A resource instance can be allocated to run a function in response to a customer request or event, and once the function has completed that instance can either be made available for processing a different event or destroyed, among other such options. In either case, the customer will not be charged for more processing by the instance than was needed to run the function.

As mentioned, the gaming servers 618 or other such systems, services, or components can utilize a surface mapping service, for example, that is able to receive position, orientation, and object location data, among other types of data discussed herein, and generate an authoritative mapping of a specific area or region, such as a gameplay region. In this example, each player device 634 can send the information to an allocated gaming server 618 for the gaming session, which can then communicate the relevant information with the surface mapping service so that the surface mapping service can update the authoritative data set as appropriate, as well as to obtain from the mapping service any relevant position or other data that should be sent to one or more devices based on, for example, changes in the orientation or location of the device, as well as for changes of other objects or positions in the mapped region as well. As mentioned, in some embodiments the information can be sent as needed for a current view of a player device, and at least some of that data can be retained in cache or memory on the device such that only changes to the data need to be transmitted, and in some embodiments the devices can each build a model of the mapped region over time. As mentioned, in some embodiments the player devices 634 can communicate with each other as well, such as to send updates in player device location or orientation, or to communicate updates in the authoritative data set, among other such options.

Figure 7:
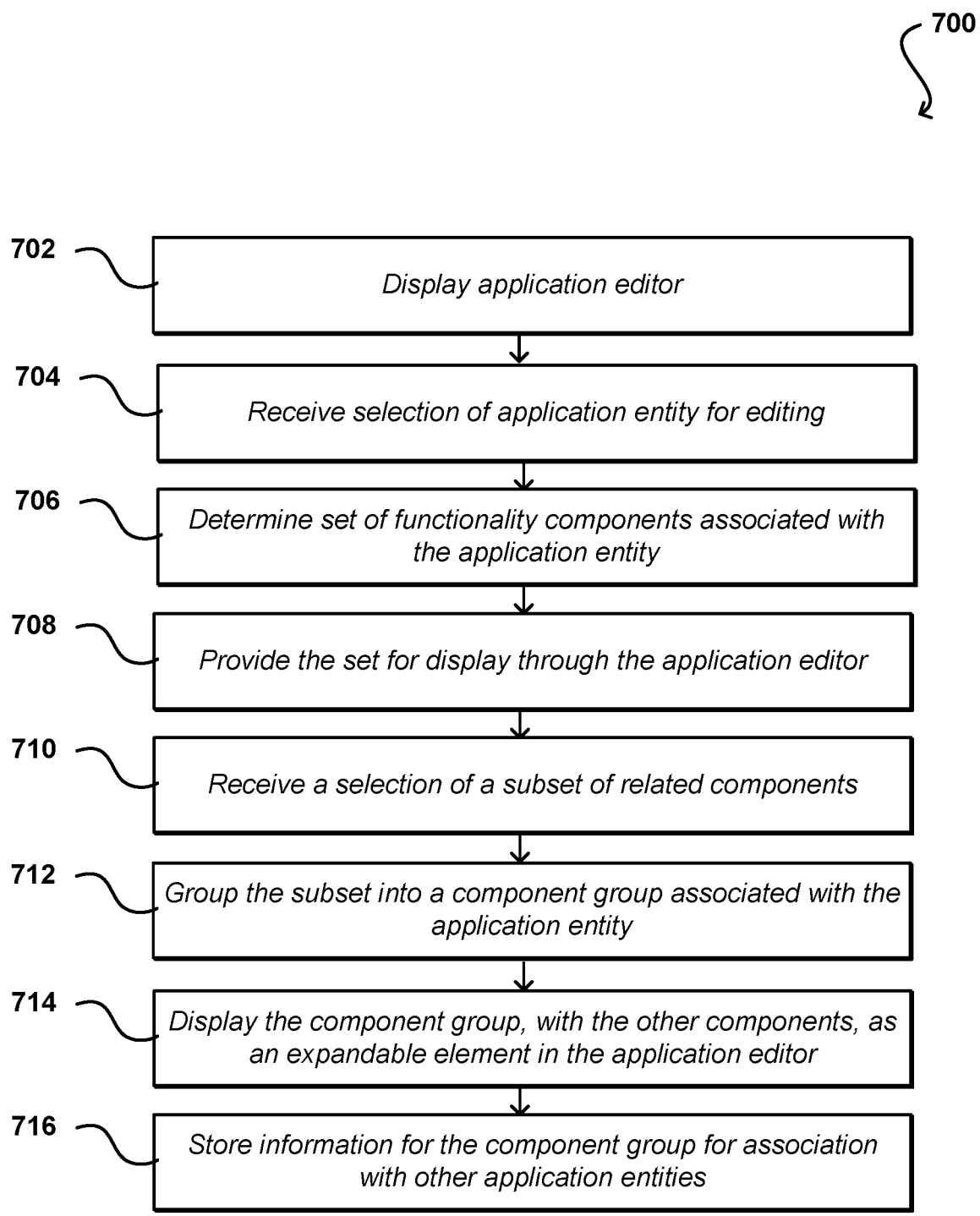
FIG. 7 illustrates an example process for managing components for an application that can be utilized in accordance with various embodiments.

FIG. 7 illustrates an example process 700 for managing functionality for an application that can be utilized in accordance with one embodiment. It should be understood for this and other processes discussed herein that there can be additional, alternative, or fewer steps performed in similar or alternative orders, or in parallel, within the scope of the various embodiments unless otherwise stated. Further, although gaming applications are a primary example utilized herein, it should be understood that other types of applications or content can benefit from advantages of the various embodiments as well as discussed and suggested herein. In this example, an application editor is displayed 702 or otherwise provided for access by a developer or other such user. Through the editor interface, a selection can be received 704 of an application entity for creation or editing. As mentioned, the application entity can be any type of entity that is to be included in the application, as may relate to the appearance, operation, or functionality of the application, among other such aspects discussed and suggested herein. A set of functionality components can also be determined 706 that are to be associated with the application entity. These can include components that are already associated with the entity, are selected by a user of the editor, or can be relevant to the type of entity, among other such options. The set, or at least a portion of the set, can then be provided 708 for display through the application editor. As mentioned, based on factors such as the number of components and size of the interface display only a subset of the associated components may be visible through the editor interface at any given time.

A selection can be received 710 of a subset of the components, as may be related based on any appropriate criterion. This can include the components being of the same type, relating to similar or related functionality, or being determined by the user to be advantageous to be grouped together, among other such options. The selected subset can then be grouped 712 into a component group that is associated with the application entity. The individual components will also remain associated with the entity, but can be accessible through the component group. The component group, along with other components or component groups associated with the entity, can then be displayed 714 as an expandable element or group associated with the entity in the application editor. As discussed, this can help to reduce the amount of content to be displayed through the interface, which can help the developer in locating and/or modifying the relevant components, or parameters of those components. Information for the component group can then be stored 716 for the application, as well as for association with other application entities of the same, or other, application.

Figure 8:
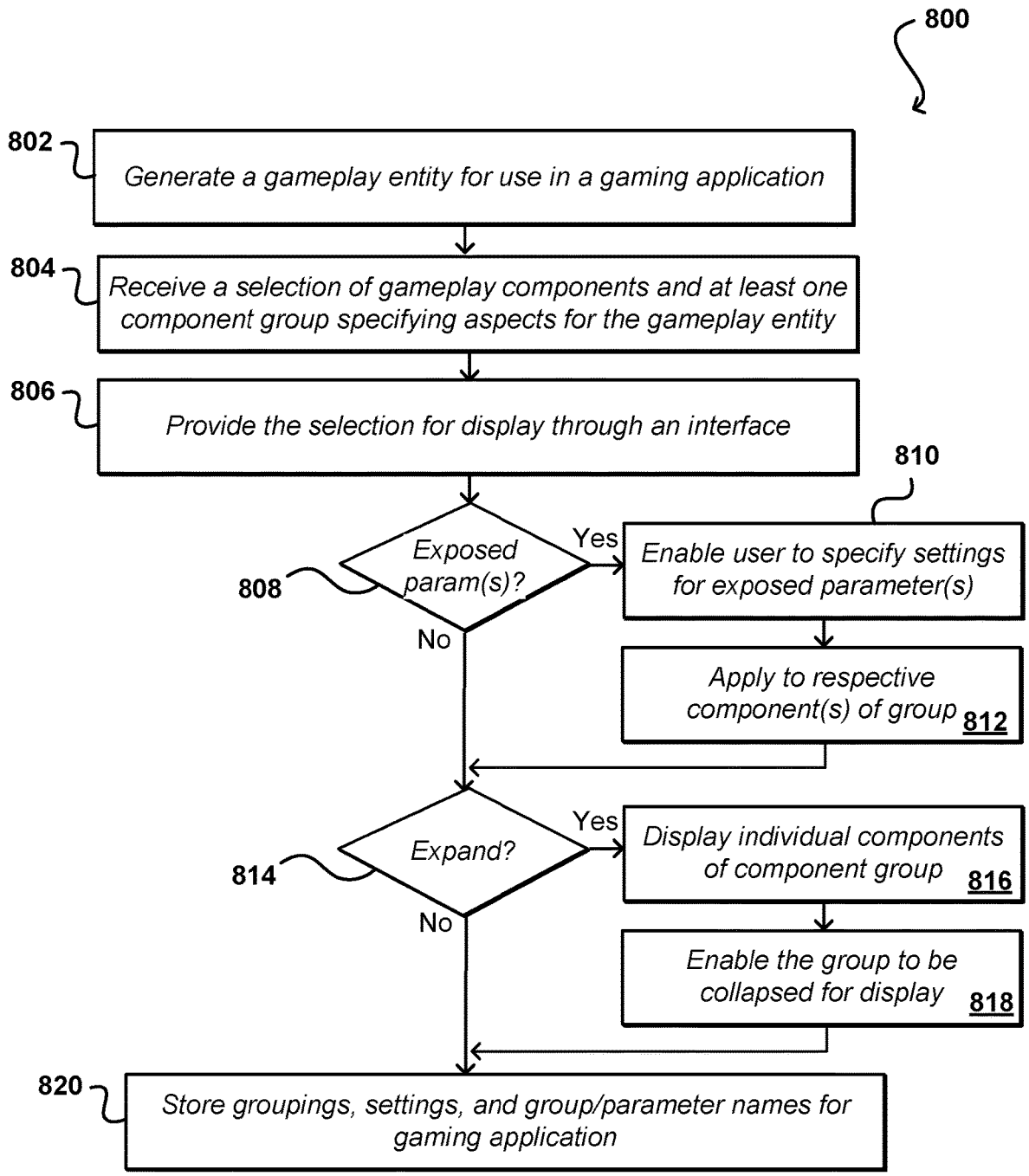
FIG. 8 illustrates an example process for managing gaming components associated with a gaming entity that can be utilized in accordance with various embodiments.

FIG. 8 illustrates another example process 800 for managing components for gameplay entities that can be utilized in accordance with various embodiments. In this example, a gameplay entity is generated 802 for use in a gameplay application. The entity can be any appropriate type of entity used for any appropriate purposes as discussed elsewhere herein. A selection of gameplay components and components groups can be received 804, where the components have parameters or settings that impact or determine various aspects of the gameplay entity as used in the gaming application when executed. The selection can be provided 806 for display through an appropriate interface, such as a gameplay editor. A determination can be made 808 as to whether there are any exposed parameters on one of the component groups.

As mentioned, a user can select one or more parameters of the grouped components to be exposed at the group level, such that the parameter(s) can be set or adjusted without expanding the component group. If so, the user can be enabled 810 to specify the settings for those parameters at the group level, and those settings can then be automatically applied 812 to the respective components of that entity group. Further, if a component group is displayed as collapsed, whereby the individual components are not displayed, an instruction can be received to expand 814 the component group through the interface. This can cause the individual components of the component group to be displayed 816, based on limitations of the interface or resolution, among other aspects discussed herein. The expanded group can also be enabled to be collapsed 818 again such that the individual components are not displayed, in order to conserve real estate for the editor and simplify the content presented concurrently to the user.

Figure 9:
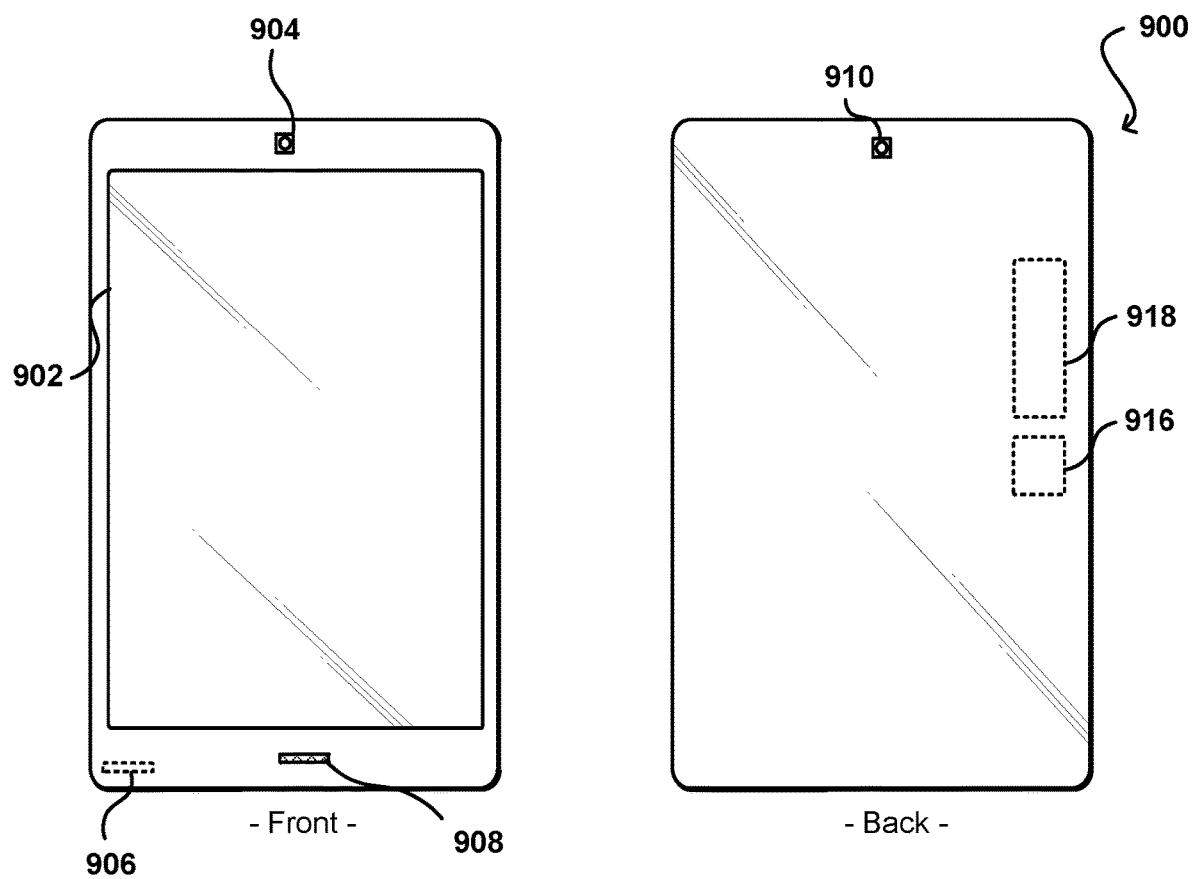
FIG. 9 illustrates an example computing device that can execute an augmented reality application in accordance with various embodiments.

FIG. 9 illustrates front and back views of an example electronic computing device 900 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, notebook computers, electronic book readers, personal data assistants, cellular phones, video gaming consoles or controllers, television set top boxes, and portable media players, among others.

In this example, the computing device 900 has a display screen 902 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including an image capture element 904 on the front of the device and at least one image capture element 910 on the back of the device. It should be understood, however, that image capture elements could also, or alternatively, be placed on the sides or corners of the device, and that there can be any appropriate number of capture elements of similar or different types. Each image capture element 904 and 910 may be, for example, a camera, a charge-coupled device (CCD), a motion detection sensor or an infrared sensor, or other image capturing technology.

As discussed, the device can use the images (e.g., still or video) captured from the imaging elements 904 and 910 to generate a three-dimensional simulation of the surrounding environment (e.g., a virtual reality of the surrounding environment for display on the display screen of the device). Further, the device can utilize outputs from at least one of the image capture elements 904 and 910 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there is one microphone 908 on the front side of the device. In some devices there may be only one microphone, while in other devices there might be at least one microphone on each side and/or corner of the device, or in other appropriate locations.

The device 900 in this example also includes one or more orientation- or position-determining elements 918 operable to provide information such as a position, direction, motion, or orientation of the device. These elements can include, for example, accelerometers, inertial sensors, electronic gyroscopes, and electronic compasses.

The example device also includes at least one communication mechanism 906, such as may include at least one wired or wireless component operable to communicate with one or more electronic devices. The device also includes a power system 916, such as may include a battery operable to be recharged through conventional plug-in approaches, or through other approaches such as capacitive charging through proximity with a power mat or other such device. Various other elements and/or combinations are possible as well within the scope of various embodiments.

Figure 10:
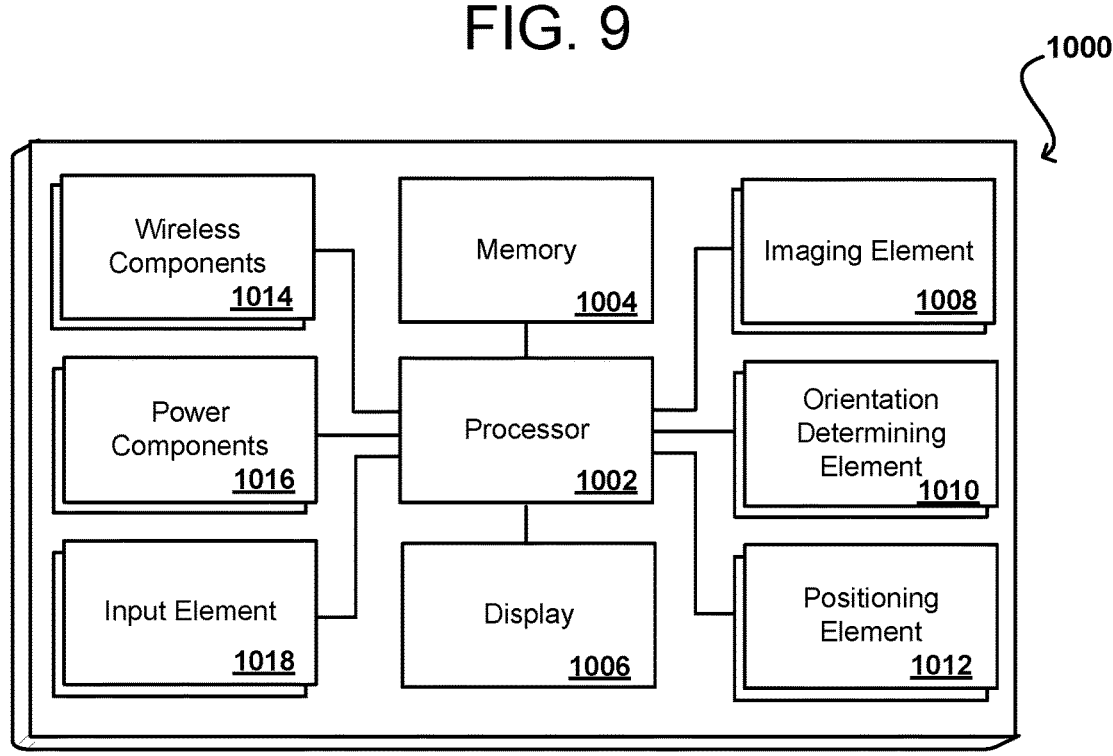
FIG. 10 illustrates example components of a computing device that can be used to implement aspects of the various embodiments.

FIG. 10 illustrates a set of basic components of an electronic computing device 1000 such as the device 900 described with respect to FIG. 9. In this example, the device includes at least one processing unit 1002 for executing instructions that can be stored in a memory device or element 1004. As would be apparent to one of ordinary skill in the art, the device can include many types of memory, data storage, or computer-readable media, such as a first data storage for program instructions for execution by the processing unit(s) 1002, the same or separate storage can be used for images or data, a removable memory can be available for sharing information with other devices, and any number of communication approaches can be available for sharing with other devices.

The device typically will include some type of display screen 1006, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 1008, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 1000 also includes at least one orientation determining element 1010 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 1000. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 1012 for determining a location of the device (or the user of the device). A positioning element can include or comprise a GPS or similar location-determining elements operable to determine relative coordinates for a position of the device. As mentioned above, positioning elements may include wireless access points, base stations, etc., that may either broadcast location information or enable triangulation of signals to determine the location of the device. Other positioning elements may include QR codes, barcodes, RFID tags, NFC tags, etc., that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 1014 operable to communicate with one or more electronic devices within a communication range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The device also includes a power system 1016, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device 1018 able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C # or C++ or any scripting language, such as Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, magnetic tape drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and other non-transitory computer readable media for containing code, or portions of code, can include any appropriate media known or used in the art, such as but not limited to volatile and non-volatile, removable and non-removable media implemented in any method or technology for storage of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    determining a gameplay entity to be utilized in a gaming application;
    identifying, during development of the gaming application, a plurality of gameplay components to be associated with the gameplay entity, the gameplay components having settings relevant to utilization of the gameplay entity in the gaming application, the settings specifying at least one visual aspect of the gameplay entity rendered in an electronic environment;
    grouping a subset of specifications corresponding to related components, of the gameplay components, into a component group under a group heading, the component group also being associated with the gameplay entity, the specifications being extracted from the related components such that the specifications are accessible via both the group heading and the related components;

causing a set of specified parameters, of the related components, to be exposed through the component group in response to a command to display the set of specified parameters;

displaying a current setting for at least one of the specified parameters of the set of specified parameters;

receiving, through an interface, a setting for one of the specified parameters in a view of the component group;

applying the setting to the respective setting of the respective component of the component group, the applied setting modifying the respective setting of the associated gameplay entity to change how the gameplay entity is utilized in the gaming application; and causing the setting to be applied to the gameplay entity during execution of the gaming application.

2. The computer-implemented method of claim 1, further comprising:

providing, for display through the interface, the component group in a collapsed state, wherein individual components of the component group are not displayed when the component group is in the collapsed state; and receiving the setting for one of the specified parameters displayed while the component group is in the collapsed state.

3. The computer-implemented method of claim 1, further comprising:

enabling multiple component groups and individual gameplay components to be displayed concurrently through the interface.

4. The computer-implemented method of claim 1, further comprising:

allowing one or more gameplay components to be added to, or removed from, the component group.

5. The computer-implemented method of claim 1, further comprising:

storing the component group, wherein the component group is able to be associated with additional gameplay entities for the gaming application.

6. A computer-implemented method, comprising:

receiving, during development of the gaming application, a selection of two or more components to be grouped into a component group, the component group collecting the two or more components under a group heading;

causing a parameter of a specified component to be exposed on the component group in response to a command to display the specified component, the parameter being extracted from the two or more components such that the parameter is accessible via both the group heading and the two or more components;

associating the component group with an entity for an application, the component group including a plurality of settings, individually corresponding to the two or more components, specifying functionality for the entity within the application;

displaying a current setting for the parameter;

receiving a value for the parameter exposed on the component group; and applying the value to the specified component of the component group, with respect to the entity, during execution of the application, the value modifying the exposed parameter to change the functionality of the entity within the application.

7. The computer-implemented method of claim 6, further comprising:

displaying the component group through an application editor, the parameter exposed on the component group being displayed independent of the two or more components grouped into the component group.

8. The computer-implemented method of claim 7, further comprising:

displaying the component group in a collapsed state wherein the individual components are not displayed through the application editor;

receiving a request to expand the component group; and displaying the two or more components of the component group through the application editor.

9. The computer-implemented method of claim 6, further comprising:

enabling one or more additional components to be added to, or removed from, the component group associated with the entity.

10. The computer-implemented method of claim 6, further comprising:

enabling a name for at least one of the component group or the exposed parameter to be specified, the name for the exposed parameter capable of being different from a corresponding name of the corresponding parameter for the corresponding component of the component group.

11. The computer-implemented method of claim 6, further comprising:

specifying an ordering for at least a subset of the components in the component group.

12. The computer-implemented method of claim 6, further comprising:

enabling a subset of components of a component group to be grouped into a sub-group of the component group, one or more parameters capable of being exposed on the sub-group.

13. The computer-implemented method of claim 6, further comprising:

storing information for the component group for use with other entities for the application or a separate application.

14. The computer-implemented method of claim 6, further comprising:

providing one or more icons for the component group indicating at least some functionality relevant to the component group.

15. The computer-implemented method of claim 6, further comprising:

including, with the component group, at least one of rules or logic for determining permissible settings for parameters of the components of the component group.

16. A system, comprising:

at least one processor; and memory including instructions that, when executed by the at least one processor, cause the system to:

receive, during development of the gaming application, a selection of two or more components to be grouped into a component group, the component group collecting the two or more components under a group heading;

cause a parameter of a specified component to be exposed on the component group in response to a command to display the specified component, the parameter being extracted from the two or more components such that the parameter is accessible via both the group heading and the two or more components;

associate the component group with an entity for an application, the component group including a plurality of settings, individually corresponding to the two or more components, specifying functionality for the entity within the application;

display a current setting for the parameter;

receive a value for the parameter exposed on the component group; and apply the value to the specified component of the component group, with respect to the entity, during execution of the application, the value modifying the exposed parameter to change the functionality of the entity within the application.

17. The system of claim 16, wherein the instructions when executed further cause the system to:

display the component group through an application editor, the parameter exposed on the component group being displayed independent of the two or more components grouped into the component group.

18. The system of claim 17, wherein the instructions when executed further cause the system to:

display the component group in a collapsed state wherein the individual components are not displayed through the application editor;

receive a request to expand the component group; and display the two or more components of the component group through the application editor.

19. The system of claim 16, wherein the instructions when executed further cause the system to:

enable one or more additional components to be added to, or removed from, the component group associated with the entity.

20. The system of claim 16, wherein the instructions when executed further cause the system to:

enable a name for at least one of the component group or the exposed parameter to be specified, the name for the exposed parameter capable of being different from a corresponding name of the corresponding parameter for the corresponding component of the component group.

* * * * *